(12) United States Patent
Gonzaga (10) Patent No.: US 7,188,518 B2
(45) Date of Patent: Mar. 13, 2007

(54) RAPID INFLATION DEVICE FOR TUBELESS TIRE

(76) Inventor: Tullio Gonzaga, 41, Via Canolo, Correggio, (Reggio Emilia) (IT) 42015

( * ) Notice: Subject to any disclaimer, the term of this patent is extended or adjusted under 35 U.S.C. 154(b) by 46 days.

(21) Appl. No.: 11/040,956

(22) Filed: Jan. 21, 2005

(65) Prior Publication Data

US 2005/0229692 A1 Oct. 20, 2005

(30) Foreign Application Priority Data

Jan. 23, 2004 (IT) .......................... VR2004A0009

(51) Int. Cl.
*E01C 23/00* (2006.01)
(52) U.S. Cl. ...................................................... 73/146
(58) Field of Classification Search ............... 73/146.3, 73/146, 146.2, 146.5; 340/425.5
See application file for complete search history.

(56) References Cited

U.S. PATENT DOCUMENTS

| 3,675,705 | A | 7/1972 | Corless |
| 3,736,975 | A | 6/1973 | Strang |
| 3,785,424 | A | 1/1974 | Rishovd |
| 3,814,163 | A | 6/1974 | Charles |
| 6,761,061 | B2 * | 7/2004 | Corghi .......................... 73/146 |
| 6,837,104 | B2 * | 1/2005 | Sapir ......................... 73/146.3 |
| 2003/0178151 | A1 | 9/2003 | Ritchie |

* cited by examiner

*Primary Examiner*—Jewel Thompson
(74) *Attorney, Agent, or Firm*—Orum & Roth, LLC (57) ABSTRACT

A rapid inflation device having a supply of pressurised pressurized fluid, a nozzle holder assembly, that can be manually moved an located by an operator between a rest position and a working position and is provided with one or more blowing-in nozzle, a flexible conduit designed to put the supply source of pressurized fluid in communication with the nozzle holder assembly, a manual control provided at the nozzle holder assembly and designed to activate and deactivate the pressurized fluid feeding on the operator's control, sensors at the nozzle holder assembly designed to detect if the nozzle holder assembly is in working position, and slave valve means adapted to control the pressurized fluid feeing from the supply source to the blowing-in nozzle, on the control of the safety sensor means and manual control means.

19 Claims, 6 Drawing Sheets

RAPID INFLATION DEVICE FOR TUBELESS TIRE

BACKGROUND OF THE INVENTION

1. Field of the Invention

The present invention relates to an inflating device, particularly suitable for quickly inflating tubeless tyres.

2. Description of the Related Art

A number of devices for quickly inflating tyres, both bell-type and ring-type provided with blowing-in nozzles in the area between wheel rim and tyre bead are known in the art. Such devices are usually installed, fixed or removable, near the rotating wheel rim supporting plate or platform of a tyre assembling-disassembling machine. More recently, patent EP-A-1 342 593 has disclosed an handlebar structure, that can be controlled by an operator and is provided, on the one hand, with control handles and, on the other hand, with blowing-in nozzles directed in the opposite direction with respect to the operator, i.e. directed, in use, towards a wheel (i.e a wheel rim with a tyre mounted thereon) to be inflated located onto the supporting and locking rotating plate or platform of a tyre assembling-disassembling machine. The handlebar inflation structure can be moved by the operator between a rest position, away from supporting platform, and a working position, in which the blowing-in nozzles are located between rim flange and tyre bead of the wheel to be inflated, ready to blow relatively high pressurised air into the tyre upon operator's control. As a matter of fact, the blowing-in nozzle or nozzles are in communication with a compressed air source, e.g. a tank fed by a suitable compressor.

The above described handlebar inflation structure is unsatisfactory from many viewpoints. First of all, it is dangerous from the point of view of the safety against injuries, since it allows compressed fluid at relatively high pressure (sometimes higher than 5 bar) to be supplied through said blowing-in nozzles, even when the handlebar structure is not in its working position, i.e. also when it is in a lifted position. This circumstance is liable to cause serious injuries to people or damages to things, in the not rare case in which the operator casually discharges high pressurised air against persons or things.

Secondly, as the handlebar structure is bound to the tyre assembling-disassembling machine by an articulated arm, the operator's movements are limited and cumbersome as the operator has to follow a predetermined constrained procedure for controlling the handlebar structure. Finally, even when the handlebar structure is formed by a pair of handles, each provided with a blowing-in nozzle assembly and articulated to a common support, it is required that the nozzles are kept in symmetrical position with respect to a plane of symmetry, which further limits the freedom of movement and control of the operator, who must pay attention to effect adjustment and positioning movements of the handlebar structure while keeping the nozzles onto the wheel rim in a substantially symmetrical way.

In addition, even when the symmetrical adjusting has been made, there is no guarantee that the nozzles of both handles correctly rest between wheel rim edge or flange and tyre bead, which results in substantial leakages of wasted compressed air and failure to inflate the tyre at a desired pressure, as compressed air is injected by some nozzles not in a correct direction towards the wheel.

SUMMARY OF THE INVENTION

The main object of the present invention is to provide an inflating device that prevents accidental compressed fluid jets from occurring, when the same is in positions that differ from its working position with respect to a tyre to be inflated, whereby a tyre can be inflated only if the inflating device in located in a correct inflation working position against a tyred wheel to be inflated.

Another object of the present invention is that said rapid inflating device is structurally very simple, highly reliable in use, and obtainable at competitive production costs.

These and other objects that will better appear below are achieved by a rapid inflating device according to the present invention, comprising a supply source of pressurised fluid, at least one nozzle holder assembly, that can be manually moved and positioned by an operator between a rest position and a working position and is provided with at least one blowing-in nozzle, at least one flexible conduit designed to put said supply source of pressurised fluid in communication with the or with a respective nozzle holder assemble, at least one manual control means provided at the or each nozzle holder assembly and designed to activate or deactivate, on operator's control, the pressurised fluid feeding, the improvement wherein it comprises safety sensor means at the or each nozzle holder assembly designed to detect if the or each nozzle holder assembly is in the working position, and slave valve means suitable for controlling the pressurised fluid feeding from said supply source to said at least one blowing-in nozzle, on control of said safety sensor means and of said at least one manual control means.

Advantageously, there are provided two nozzle holder assemblies, one for the right hand and the other for the left hand of the operator. If desired, the two nozzle holder assemblies are bounded each other, but they can be independently spaced apart one from another.

BRIEF DESCRIPTION OF THE DRAWINGS

Further features and advantages will better appear from a detailed description of some embodiments of a rapid inflation device according to the present invention, given by way of non-limiting examples of carrying out the invention, with reference to the accompanying drawings, in which.

DESCRIPTION OF THE PREFERRED EMBODIMENTS

In the accompanying drawings the same or similar parts or components are indicated with the same reference numerals.

With reference first to the embodiment shown in FIGS. 1–4 and 9, it will be noted hat a rapid inflation device according to the present invention, generally indicated as 1, comprises a supply source 2 of pressurised fluid, typically including a compressed air tank fed by a compressor (not shown in the drawings) of any suitable type, and two nozzle holder assemblies 3 and 4, that can be manually moved and controlled by an operator between a rest position and a working position, each nozzle holder assembly comprising one or more blowing-in nozzles 5. The inflation device 1 also comprises one or two flexible conduits 6 and 7, designed to put the supply source 2 of pressurised fluid into communication with a respective nozzle holder assembly, 3 and 4 respectively. Nozzle holder assemblies 3 and 4 each supports two respective manual controls, e.g. each comprising a respective shutoff valve 8 and 9, that can be operated through a button, 8a and 9a respectively. The button is designed to be pressed by an operators finger, the operator holding nozzle holder assemblies 3 and 4 in his hand. Generally, it is preferred to provide a shutoff valve only, e.g. valve 8, as it is sufficient the consent given by one operator's hand.

Advantageously, each nozzle holder assembly is formed by a rigid collector, such as a pipe part with a blind end.

The inflation device 1 also comprises safety sensor means, e.g. including four shutoff valves 10, 10a and 11, 11a, each operated by means of a respective feeler button, designed to rest against the bead of a tyre P to be inflated, which is mounted onto a wheel rim C for detecting whether the respective nozzle holder assembly is in its correct working position. Finally, there is provided safety valve means, e.g. comprising an opening-closing valve 13 (normally closed), which is controlled by a check valve 14 connected in series with both shutoff valves 8 and 9 and shutoff valves 10, 10a, 11 and 11a. With this structure, the opening-closing valve 14 will drive valve 13 to open, whereby :supplying pressurised fluid from reservoir 2 to blowing-in nozzles 5, only if all shutoff valves 8 and 9 and safety valves 10 and 10a, 11 and 11a are open.

Figure 1:
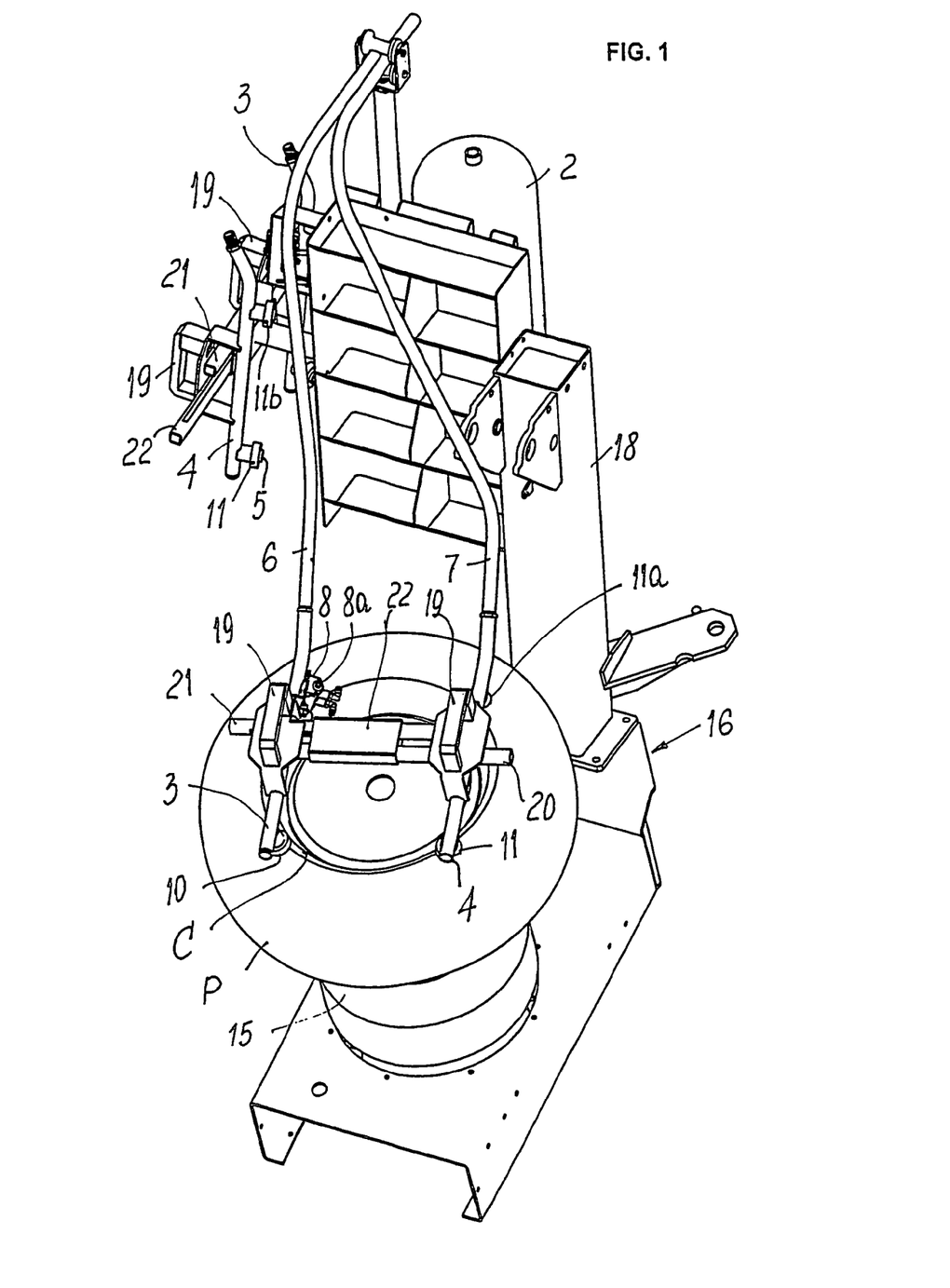
FIG. 1 shows a diagrammatic prospective view of a rapid inflating device according to the present invention, as applied to a tyre assembling/disassembling machine and illustrated with two nozzle holder assemblies, right and left, in a working position onto a tyred wheel to be inflated, which is located and locked to the rotating platform of a tyre assembling-disassembling machine.
Figure 2:
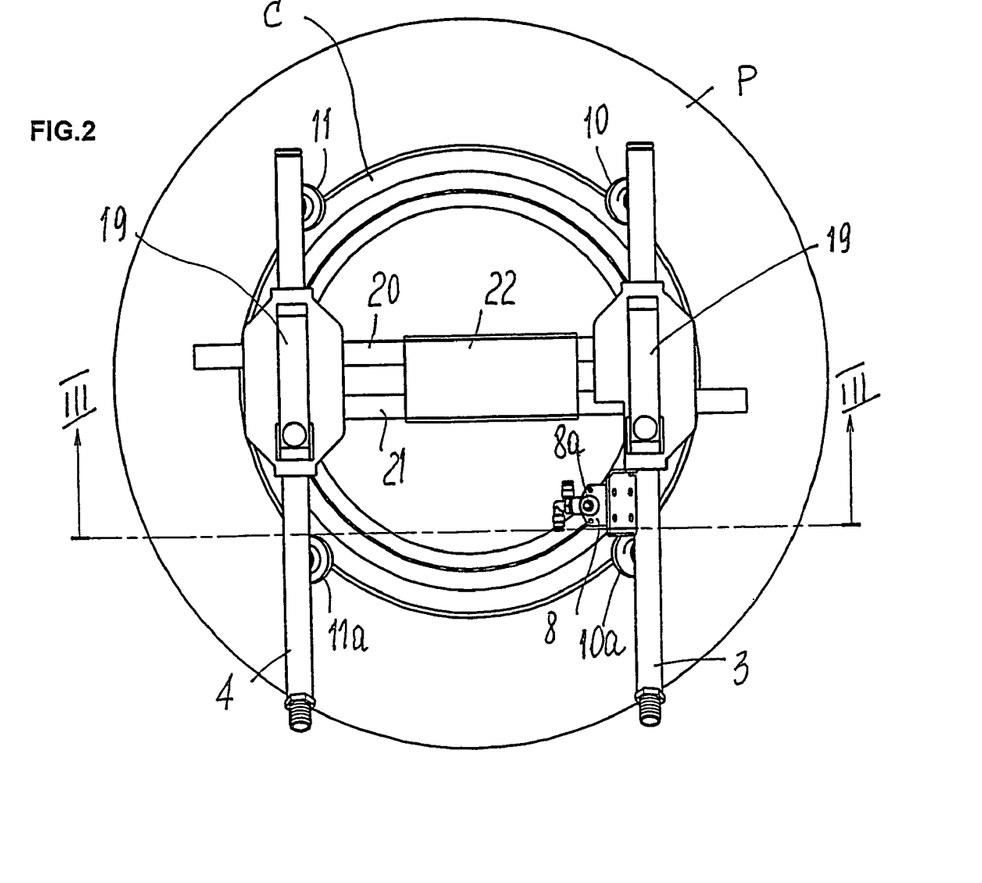
FIG. 2 shows a partial plant view of the rapid inflating device of FIG. 1.
Figure 3:
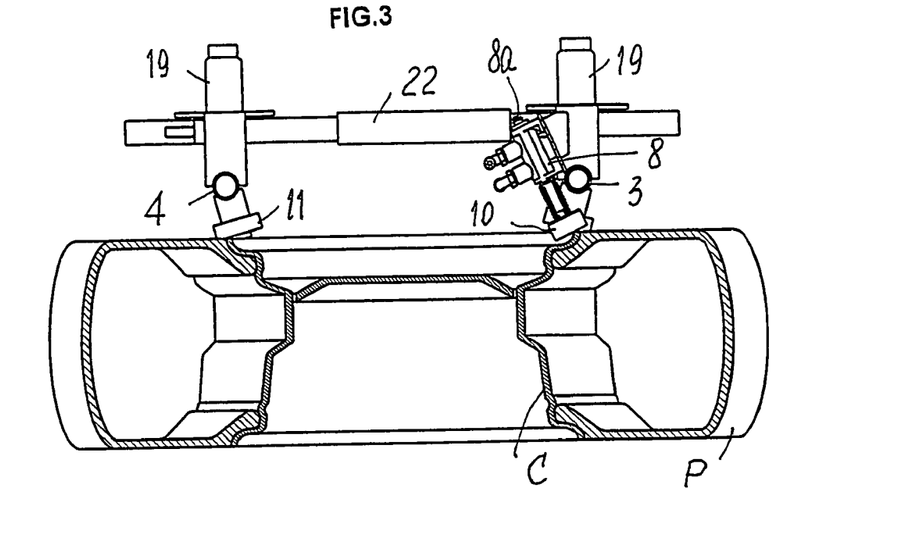
FIG. 3 is a diametral section view taken along line III—III of FIG. 2 and of two nozzle holder assemblies, right and left, located thereon, one assembly being illustrated in cross-section.
Figure 4:
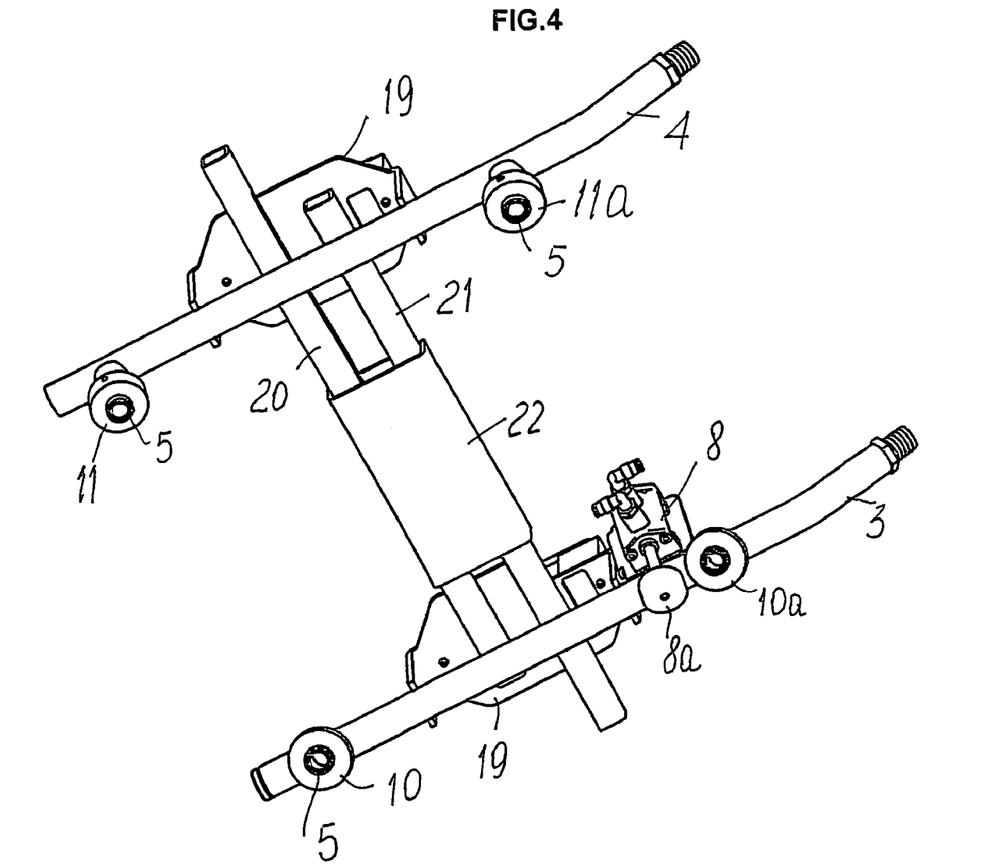
FIG. 4 illustrates a bottom view of the rapid inflation device of FIGS. 1–3.

In FIG. 1, tyre P and wheel rim C forming the tyred wheel to be inflated are located over the rotating table 15 of a tyre assembling-disassembling machine 16 provided with a frontal pedestal 17 supporting the rotating table 15, and a rear upright 18, on which nozzle holder assemblies 3 and 4 can be suspended in a rest position. On the upright 18, reservoir 2 and, preferably, valves 13 and 14 are also supported.

If desired, nozzle holder assemblies 3 and 4 are provided with a suitable handle or grip 19 and slidingly connected to one another, e.g. by way of a respective rod 20 and 21 having a square cross-section, and slidingly mounted in a box-type sleeve 22, so that one nozzle holder assembly can move independently from the other, e.g. to manually adapt itself to different diameters of wheels to be inflated. Such an adaptation can preferably occur by drawing in and holding one nozzle holder assembly in position between the edge of the rim C and the bead of the tyre P and extending the other to a position diametrically opposite to the first one, over the tyre P.

Preferably, feelers 12 of the safety valves 10, 10a and 11, 11a can be slidingly arranged along and about (FIGS. 1 and 4) the nozzles 5, thereby being activated through the operator's pressing action, only after a respective nozzle being penetrated between rim edge and beam of the tyre P.

Figure 5:
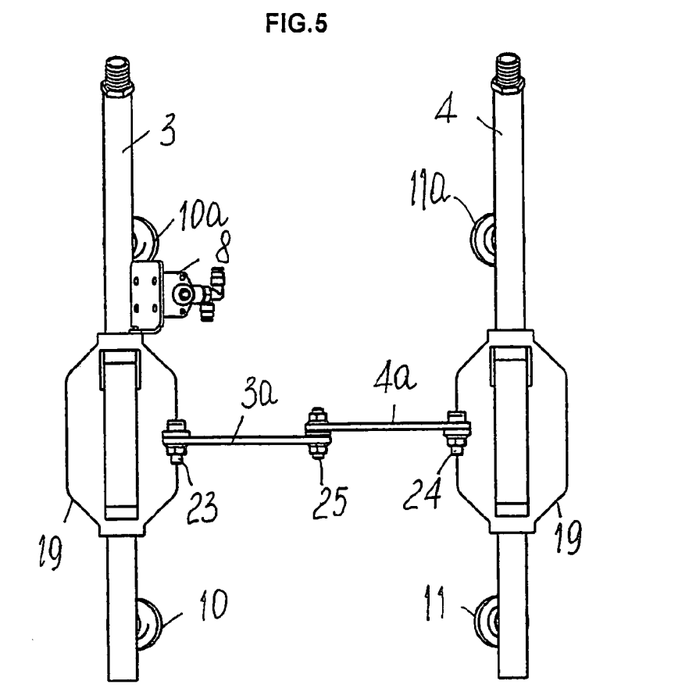
FIG. 5 is a plant diagrammatic view of another embodiment of the rapid inflating device according to the present invention, in which two nozzle holder assemblies are bound one to another by way of two articulated rods.
Figure 6:
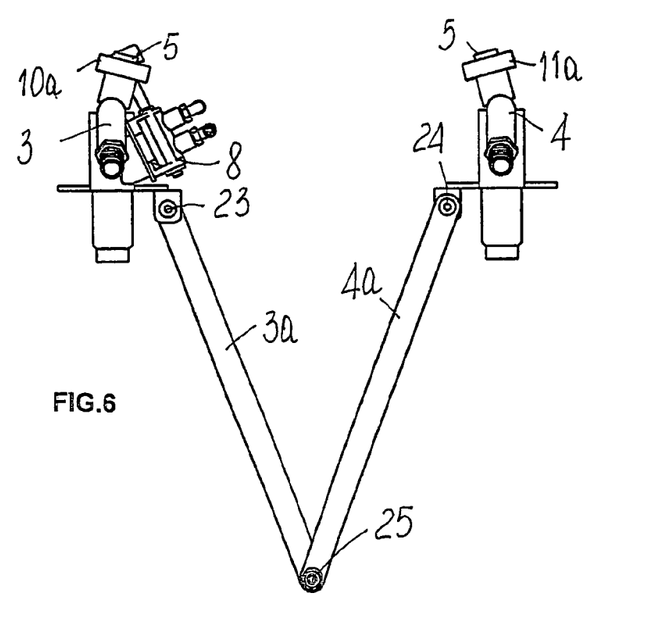
FIG. 6 shows a plant diagrammatic view of the rapid inflation device of FIG. 5.

In the embodiment illustrated in FIGS. 5 and 6, the two nozzle holder assemblies 3 and 4 are connected to one another through two rods 3a and 4a respectively, which rods have one end thereof articulated, respectively at 23 and 24, to the respective nozzle holder assembly 3 and 4, whereas the other end thereof is articulated to a common pin 25. Pins 23, 24 and 25 have their axis substantially parallel one to another, whereby the mutual constraint is such to allow one nozzle holder assembly to move near or away from the other.

Figure 7:
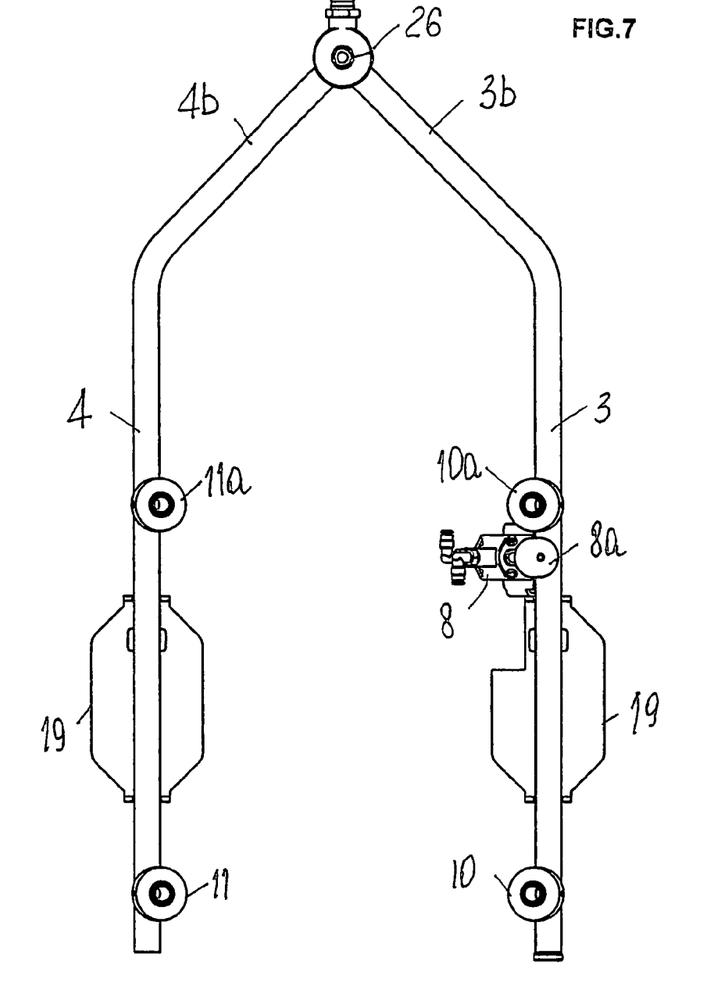
FIG. 7 is a bottom view, in use, of a rapid inflating device according a variant of the present invention.
Figure 8:
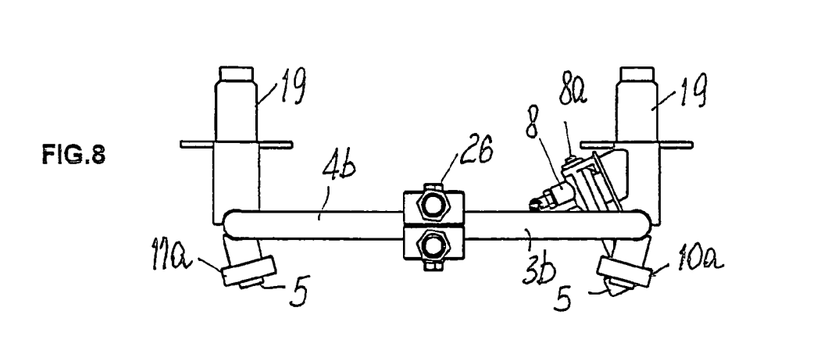
FIG. 8 is a top view of the inflation device of FIG. 7.
Figure 9:
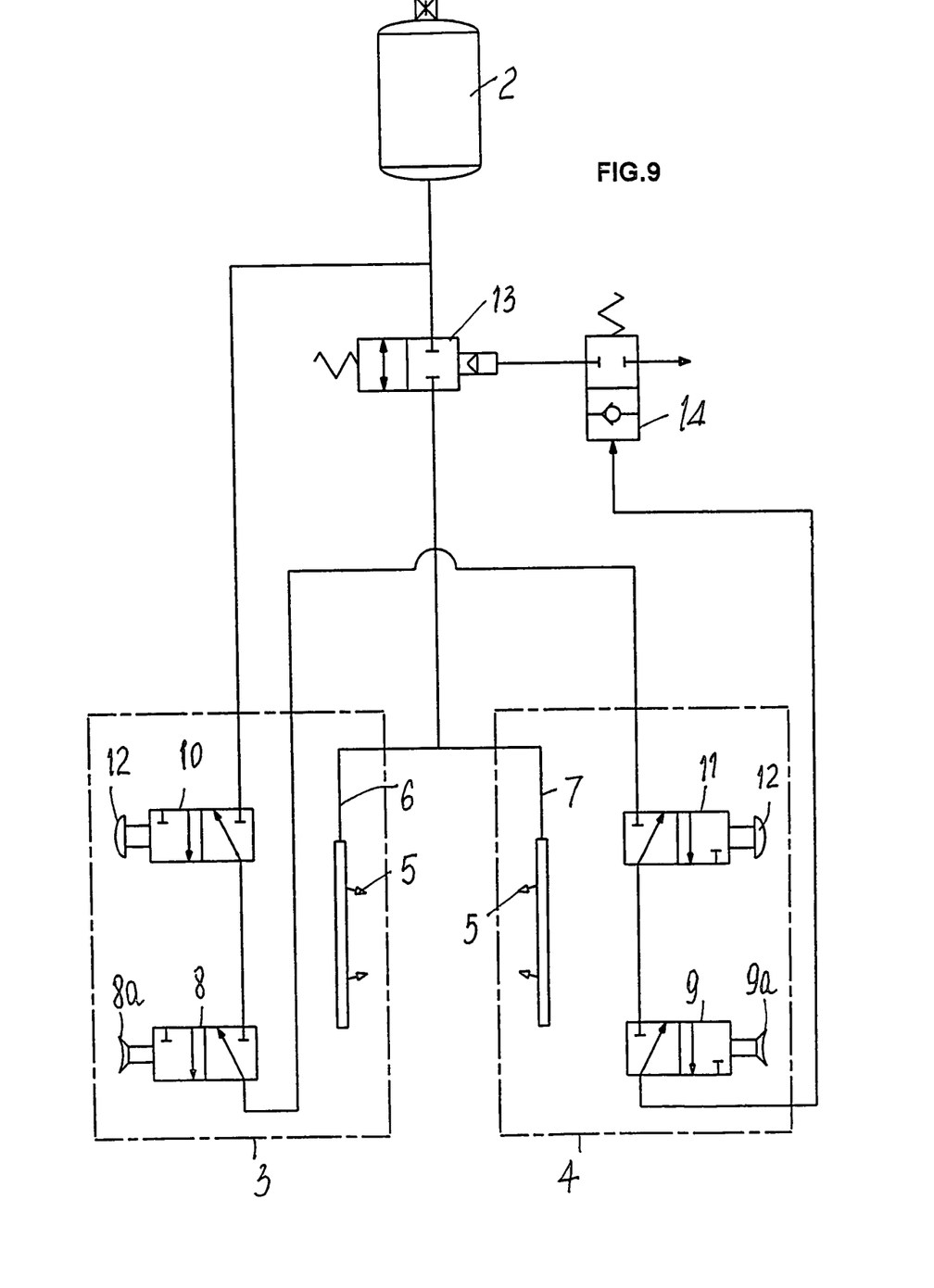
FIG. 9 shows the pneumatic circuit comprising sensor means and valve means for controlling a rapid inflation device according to the present invention.

FIGS. 7 and 8 show an embodiment in which nozzle holder assemblies 3 and 4 have a respective extension 3b and 4b, that is articulated to the free end thereof about a common pin 26, whereby they can be reciprocally opened wide independently from each other along a common displacement plane.

The above described rapid inflation device substantially operates as follow.

When not in use, the rapid inflation device can be kept in the rest position hung on a suitable support, such as the rear upright of a tyre assembling-disassembling machine, a wall, or the like. In its rest position, the safety valve is permanently closed and not permit a fluid feeding.

Once rapid inflation device 1 has been carried while the inflating device is in its working position against a wheel to be inflated, such that nozzles 5 are pressed by the operator between the peripheral edge of the rim C and the bead of the tyre P, whereby sensors 12 can be loaded and the operator presses buttons 8a and 9a, the opening-closing valve 13 is activated by the non-return valve 14 to generate relatively high pressurised air supply between the beam tyre and the rim for a sudden inflation of the tyre P.

As soon as the operator release also only one of the push buttons 8a and 9a, the valve 13 closes.

The above described rapid inflation device therefore prevents the operator from inadvertently or deliberately use the device itself like an air pistol against persons or thinks, which would cause injuries and damages, the same device being capable to supply pressurised air only when resting and being pressed against a wheel to be inflated. Moreover, owing to the fact that nozzle holder assemblies 3 and 4 are movable independently from one another, the operator can proceed to adjust in a simple and quick way the inflating device to different diameters of wheels to be inflated, preferably first placing one tool assembly in the working position and then adjusting the other. As the inflating device is bounded to the pressurised fluid source 2 by only one or two flexible pipe, the operator has a great working freedom, and can locate the inflating device in a rest position in a comfortable way.

The above described rapid inflation device is susceptible to numerous modifications and variations within the scope as defined by the claims. Thus, for example, sensor means 10, 11, 12 can be electrically or electronically operated and electrically connected in series and adapted to send an electric control to an opening/closing valve 13, which in turn comprises a suitable solenoid valve. Similarly, buttons 8a and 9a can be designed to control a respective electric witch connected in series with the sensors 10 and 11.

The invention claimed is:

1. A rapid inflation device having a supply source of pressurized fluid, comprising at least one nozzle holder assembly that can be manually moved and located by an operator between a rest position and a working position, at least one blowing-in nozzle, at least one flexible conduit arranged to out said supply source of pressurized fluid in communication with the respective nozzle holder assembly, at least one manual control means arranged at each said nozzle holder assembly and designed to activate and deactivate the pressurized fluid feeding on operator's control, a safety sensor means at each said nozzle holder assembly designed to detect whether the nozzle holder assembly is in working position, and a slave valve means adapted to control pressurised fluid feeding from said supply source to said at least one blowing-in nozzle upon control of said safety sensor means and said at least one manual control means,
wherein said at least one manual control means and said safety sensor means each comprises a button driven control pneumatic valve.

2. A tire assembling-disassembling machine comprising an inflating device as claimed in claim 1.

3. A device as claimed in claim 1, further comprising two nozzle holder assemblies each including a feeding collector for said nozzles which is provided with an handle.

4. A device as claimed in claim 3, wherein said nozzle carrier assemblies comprise reciprocal constraint means suitable for allowing mutual relative movements independently one from another.

5. A device as claimed in claim 4, wherein said constraint means comprises a box-type sleeve, a pair of parallel rods slidingly mounted within said box-type sleeve and each having one end fixed to a respective nozzle holder assembly.

6. A device as claimed in claim 4, wherein said constraint means comprises a pair of rods having one respective and articulated to a common articulation pin and the other end articulated to a respective nozzle holder assembly.

7. A device as claimed in claim 4, wherein said constraint means comprises a common articulation pin between a respective extension of said nozzle holder assemblies.

8. A rapid inflation device having a supply source of pressurized fluid, comprising at least one nozzle holder assembly that can be manually moved and located by an operator between a rest position and a working position, at least one blowing-in nozzle, at least one flexible conduit arranged to put said supply source of pressurized fluid in communication with the respective nozzle holder assembly, at least one manual control means arranged at each said nozzle holder assembly and designed to activate and deactivate the pressurized fluid feeding on operator's control, a safety sensor means at each said nozzle holder assembly designed to detect whether the nozzle holder assembly is in working position, and a slave valve means adapted to control pressurised fluid feeding from said supply source to said at least one blowing-in nozzle upon control of said safety sensor means and said at least one manual control means,
wherein said safety valve means comprises at least one solenoid valve and said at least one manual control means and said a safety sensor means each comprises an electrical on/off switch, which can be controlled by way of a button, said electrical switch means being electrically connected in series one to another and to said solenoid valve, thereby sending thereto a control signal for supplying pressurised fluid when all the switch means are in an on position.

9. A device as claimed in claim 8, further comprising two nozzle holder assemblies each including a feeding collector for said nozzles which is provided with an handle.

10. A device as claimed in claim 9, wherein said nozzle carrier assemblies comprise reciprocal constraint means suitable for allowing mutual relative movements independently one from another.

11. A device as claimed in claim 10, wherein said constraint means comprises a box-type sleeve, a pair of parallel rods slidingly mounted within said box-type sleeve and each having one end fixed to a respective nozzle holder assembly.

12. A device as claimed in claim 10, wherein said constraint means comprises a box-type sleeve, a pair of parallel rods slidingly mounted within said box-type sleeve and each having one end fixed to a respective nozzle holder assembly.

13. A device as claimed in claim 10, wherein said constraint means comprises a box-type sleeve, a pair of parallel rods slidingly mounted within said box-type sleeve and each having one end fixed to a respective nozzle holder assembly.

14. A rapid inflation device having a supply source of pressurized fluid, comprising at least one nozzle holder assembly that can be manually moved and located by an operator between a rest position and a working position, at least one blowing-in nozzle, at least one flexible conduit arranged to put said supply source of pressurized fluid in communication with the respective nozzle holder assembly, at least one manual control means arranged at each said nozzle holder assembly and designed to activate and deactivate the pressurized fluid feeding on operator's control, a safety sensor means at each said nozzle holder assembly designed to detect whether the nozzle holder assembly is in working position, a slave valve means adapted to control pressurised fluid feeding from said supply source to said at least one blowing-in nozzle upon control of said safety sensor means and said at least one manual control means and, two nozzle holder assemblies each including a feeding collector for said nozzles which is provided with an handle.

15. A device as claimed in claim 14, wherein said nozzle carrier assemblies comprise reciprocal constraint means suitable for allowing mutual relative movements independently one from another.

16. A device as claimed in claim 15, wherein said constraint means comprises a box-type sleeve, a pair of parallel rods slidingly mounted within said box-type sleeve and each having one end fixed to a respective nozzle holder assembly.

17. A device as claimed in claim 15, wherein said constraint means comprises a pair of rods having one respective and articulated to a common articulation pin and the other end articulated to a respective nozzle holder assembly.

18. A device as claimed in claim 15, wherein said constraint means comprises a common articulation pin between a respective extension of said nozzle holder assemblies.

19. A device as claimed in claim 14, wherein said constraint means comprises a box-type sleeve, a pair of parallel rods slidingly mounted within said box-type sleeve and each having one end fixed to a respective nozzle holder assembly.

* * * * *

UNITED STATES PATENT AND TRADEMARK OFFICE
CERTIFICATE OF CORRECTION

PATENT NO.         : 7,188,518 B2
APPLICATION NO.    : 11/040956
DATED              : March 13, 2007
INVENTOR(S)        : Tullio Gonzaga It is certified that error appears in the above-identified patent and that said Letters Patent is hereby corrected as shown below:

On the title page add item (73),

--Assignee: Butler Engineering & Marketing S.P.A.--

Signed and Sealed this

Sixth Day of November, 2007

JON W. DUDAS
*Director of the United States Patent and Trademark Office*